(12) United States Patent
Klaus

(10) Patent No.: US 10,533,451 B2
(45) Date of Patent: Jan. 14, 2020

(54) GEARED GAS TURBINE ENGINE

(71) Applicant: ROLLS-ROYCE DEUTSCHLAND LTD & CO KG, Blankenfelde-Mahlow, Dahlewitz (DE)

(72) Inventor: Christoph Klaus, Dahlewitz (DE)

(73) Assignee: ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 369 days.

(21) Appl. No.: 15/642,613

(22) Filed: Jul. 6, 2017

(65) Prior Publication Data
US 2018/0016939 A1    Jan. 18, 2018

(30) Foreign Application Priority Data

Jul. 12, 2016  (GB) .................................. 1612099.0

(51) Int. Cl.
| | |
|---|---|
| F01D 25/04 | (2006.01) |
| F16H 1/28 | (2006.01) |
| F16H 57/00 | (2012.01) |
| F02C 7/36 | (2006.01) |
| F02K 3/04 | (2006.01) |

(52) U.S. Cl.
CPC ................ *F01D 25/04* (2013.01); *F02C 7/36* (2013.01); *F02K 3/04* (2013.01); *F16H 1/28* (2013.01); *F16H 57/0006* (2013.01)

(58) Field of Classification Search
CPC ........ F01D 25/04; F16H 57/0006; F16H 1/28; F16H 57/08; F05D 2260/96; F05D 2300/501; F05D 2260/40311; F02K 3/04; F02C 7/36
See application file for complete search history.

(56) References Cited

U.S. PATENT DOCUMENTS

| 3,459,072 A | 8/1969 | Shannon |
| 8,858,388 B2 | 10/2014 | McCune et al. |
| 2016/0186604 A1 | 6/2016 | Ertas |

FOREIGN PATENT DOCUMENTS

GB       1 363 151 A      8/1974

OTHER PUBLICATIONS

Nov. 15, 2017 Search Report issued in European Patent Application No. 17 17 9821.
Jan. 12, 2017 Search Report issued in British Patent Application No. GB1612099.0.

*Primary Examiner* — Xiao En Mo
(74) *Attorney, Agent, or Firm* — Oliff PLC

(57) ABSTRACT

A gas turbine engine comprising a gearbox, the gearbox comprising a sun gear, an annulus gear, a plurality of planet gears and a carrier, each planet gear being rotatably mounted in the carrier by at least one bearing, the sun gear meshing with the planet gears and the planet gears meshing with the annulus gear, the sun gear, the planet gears and the annulus gear comprising gear teeth, the annulus gear having a length in the axial direction and an axially forward end and an axially rearward end and wherein the annulus gear is resiliently mounted to a supporting structure at both its axially forward and axially rearward ends.

20 Claims, 7 Drawing Sheets

GEARED GAS TURBINE ENGINE

The present disclosure concerns a geared gas turbine engine and in particular to a geared turbofan gas turbine engine or a geared turbo propeller gas turbine engine.

A geared turbofan gas turbine engine or a geared turbo propeller gas turbine engine comprises a gearbox which is arranged to drive the fan or propeller. The gearbox comprises an annulus gear which is arranged to be static where the gearbox is a planetary gearbox.

In the design of an annulus gear two conflicting requirements arise. The first is that in order to be capable of accepting the radial components of tooth load due to the pressure angles of the teeth without failing in fatigue, the annulus has to be made as a stiff ring. However, to minimise the overloads on the teeth of the planet gears due to pitch errors in the teeth or deformations in the system, the annulus gear should be flexible.

In the power gearbox for a gas turbine the weight and size of the gearbox is at a premium. In GB1363151 there is taught an annulus gear that is supported by a stiff backing ring that is separated from the annulus gear by a narrow annular chamber that is configured to accept a hydraulic fluid. The hydraulic fluid is oil. The annulus gear is made relatively flexible so that it deforms under any overloading due to inaccuracies in the manufacture of the gear teeth or any misalignment of the gears. When the annulus gear flexes locally the clearance between the annulus gear and the stiff outer annulus changes and the oil is caused to be pushed into or out of the reservoir in the space between the rings and the resistance of the oil to this movement causes a force which opposes the flexing of the annulus gear.

A disadvantage of the arrangement described in GB1363151 is the cantilevered mounting of the backing ring. This single sided coupling has a degree of movement that allows axial divergence between the annulus gear and the backing plate i.e. the gap widens along the axial length of the annulus gear. The axial divergence can promote leakage of oil and an imbalance to the pressure in the squeezed film of oil.

The present disclosure seeks to provide a geared gas turbine engine which reduces or overcomes this problem.

According to a first aspect of the present disclosure there is provided a gas turbine engine comprising a gearbox, the gearbox comprising a sun gear, an annulus gear, a plurality of planet gears and a carrier, each planet gear being rotatably mounted in the carrier by at least one bearing, the sun gear meshing with the planet gears and the planet gears meshing with the annulus gear, the sun gear, the planet gears and the annulus gear comprising gear teeth, the annulus gear having a length in the axial direction and an axially forward end and an axially rearward end and wherein the annulus gear is resiliently mounted to a static supporting structure at both its axially forward and axially rearward ends.

The gear teeth of the annulus gear may be helical

The static supporting structure may be radially outside the annulus gear and separated from the annulus gear by a cavity configured to receive a damping volume of hydraulic fluid.

The damping volume of hydraulic fluid may reduce vibrations in the system.

The static supporting structure may have one or more conduits adapted to supply hydraulic fluid to the cavity. If two conduits are provided a first one of the two conduits may be located in a first half of the axial length of the supporting structure and a second one of the two conduits may be located in a second half of the axial length of the static supporting structure.

The cavity may comprise hydraulic seals at an axially forward end and an axially rearward end.

If two conduits are provided two further hydraulic seals may be positioned between the first one of the two conduits and the second one of the two conduits.

The annulus gear may have one or more attachment locations configured to secure a first end of a damping linkage and the static support structure has one or more attachment locations configured to secure a second end of the damping linkage.

The engine may further comprising a damping linkage connecting a first attachment location on the annulus gear and a second attachment location on the static support structure.

The first attachment location and the second attachment location may be circumferentially offset.

Where the carrier has an intended direction of circumferential rotation the first attachment location may be circumferentially forward of the second attachment location.

Multiple damping linkages may be provided each connecting a respective first attachment location with a respective second attachment location.

At least one of the first attachment locations may be on an axially forward end of the annulus gear and at least one of the second attachment locations may be on an axially forward end of the static support structure.

At least one of the first attachment locations may be on an axially rearward end of the annulus gear and at least one of the second attachment locations may be on an axially rearward end of the static support structure.

The annulus gear may have a first damping linkage extending axially and laterally from the forward end to the support structure and a second damping linkage extending axially and laterally from the rearward end to the static support structure.

Each damping linkage may have a length between the annulus gear and the static support structure, a width in the lateral direction and a depth, wherein the depth is less than both the width and the length for permitting movement of the annulus gear in the depth direction and constraining the movement of the annulus gear in the length and lateral direction.

A thin film damper support structure may be positioned radially outside the annulus gear and separated from the annulus gear by a cavity configured to receive a damping volume of hydraulic fluid.

The thin film damper supporting structure may have one or more conduits adapted to supply hydraulic fluid to the cavity. The cavity may comprise hydraulic seals at an axially forward end and an axially rearward end.

The thin film damper supporting structure may have two conduits adapted to supply hydraulic fluid to the cavity, wherein a first one of the two conduits may be located in a first half of the axial length of the thin film damper supporting structure and a second one of the two conduits may be located in a second half of the axial length of the supporting structure.

The gas turbine engine may further comprise two further hydraulic seals positioned between the first one of the two conduits and the second one of the two conduits.

According to a second aspect there is provided a gas turbine engine comprising a gearbox, the gearbox comprising a sun gear, an annulus gear, a plurality of planet gears and a carrier, each planet gear being rotatably mounted in the carrier by at least one bearing, the sun gear meshing with the planet gears and the planet gears meshing with the annulus gear, the sun gear, the planet gears and the annulus gear comprising gear teeth, the annulus gear having a length in the axial direction and an axially forward end and an axially rearward end and wherein the annulus gear is resiliently mounted to a supporting structure at its axial midpoint and wherein two thin film damper support structures are positioned radially outside the annulus gear and separated from the annulus gear by respective cavities configured to receive a damping volume of hydraulic fluid.

The gas turbine of the first and/or second aspect may comprise a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

The gas turbine of the first and/or second aspect may comprise a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

The gas turbine of the first and/or second aspect may comprise a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

The gas turbine of the first and/or second aspect may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

The propulsor may be a fan or a propeller.

The sun gear, the planet gears and the annulus gear may comprise two sets of helical gear teeth.

Embodiments of the disclosure will now be described by way of example only, with reference to the Figures, in which.

Figure 1:
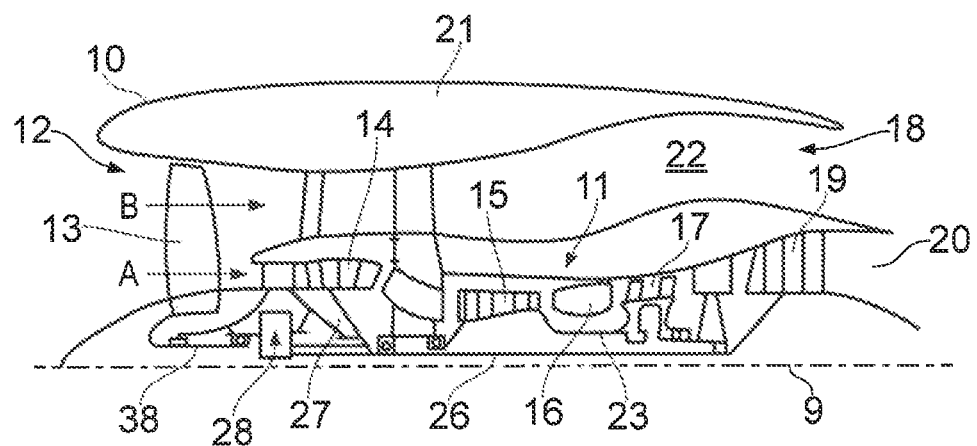
FIG. 1 is a part sectional side view of a geared turbofan gas turbine engine according to the present disclosure.
Figure 2:
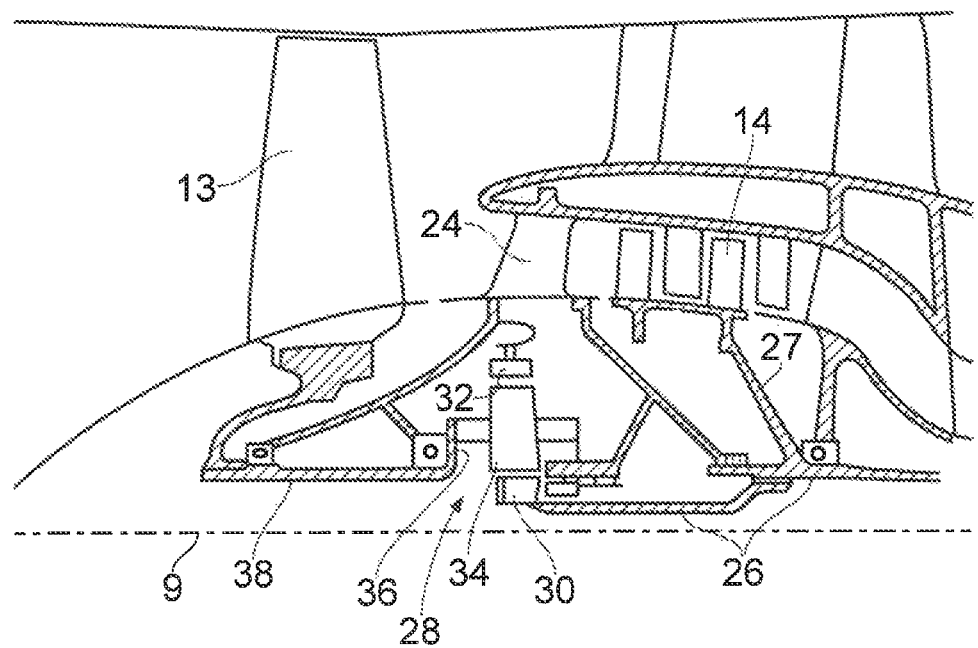
FIG. 2 is an enlarged part sectional side view of a portion of the geared turbofan gas turbine engine shown in FIG. 1.
Figure 8:
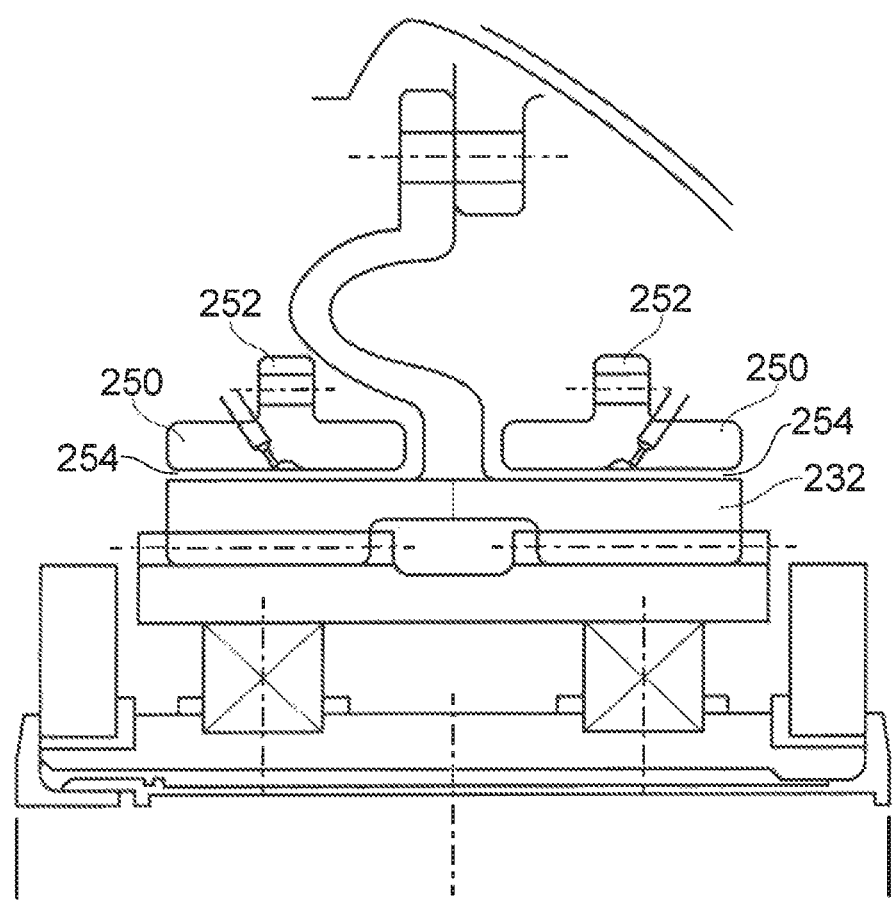

FIG. 8 is a cross-sectional view though a further gearbox according to the present disclosure With reference to FIGS. 1 and 2, a geared turbofan gas turbine engine is generally indicated at 10, having a principal and rotational axis 9. The engine 10 comprises, in axial flow series, an air intake 12, a propulsive fan 13, an intermediate-pressure, or booster, compressor 14, a high-pressure compressor 15, combustion equipment 16, a high-pressure turbine 17, a low-pressure turbine 19 and a core exhaust nozzle 20. The intermediate-pressure compressor 14, the high-pressure compressor 15, the combustion equipment 16, the high-pressure turbine 17 and the low-pressure turbine 19 form a core engine 11. A nacelle 21 generally surrounds the engine 10 and defines the intake 12, a bypass duct 22 and a bypass exhaust nozzle 18.

The gas turbine engine 10 works in the conventional manner so that air entering the intake 12 is compressed by the fan 13 to produce two air flows: a first air flow A into the intermediate-pressure compressor 14 and a second air flow B which passes through the bypass duct 22 to provide the majority of the propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high and low-pressure turbines 17, 19 before being exhausted through the core nozzle 20 to provide additional propulsive thrust. The high-pressure turbine 17 drives the high-pressure compressor 15 by a shaft 23. The low-pressure turbine 19 drives the intermediate-pressure compressor 14 directly via shafts 26 and 27. The low-pressure turbine 19 drives the fan 13 indirectly via the shaft 26, a gearbox 28 and a shaft 38. The gearbox 28 comprises a sun gear 30, an annulus gear 32, a plurality of planet gears 34 and a carrier 36. The sun gear 30 meshes with the planet gears 34 and the planet gears 34 mesh with the annulus gear 32. The carrier 36 constrains the planet gears 34 to process around the sun gear 30 in synchronicity whilst enabling each planet gear 34 to rotate about its own axis independently. The carrier 36 is coupled via the shaft 38 to the fan 13 in order to drive its rotation about the engine axis 9. The annulus gear 32 is coupled to a static structure 24. The axes of the planet gears 34 and the axis of the carrier 36 are parallel to the engine axis 9. The shaft 38 is rotatably mounted in static structure by one or more bearings, e.g. rolling element bearings, e.g. roller bearings or ball bearings.

Figure 3:
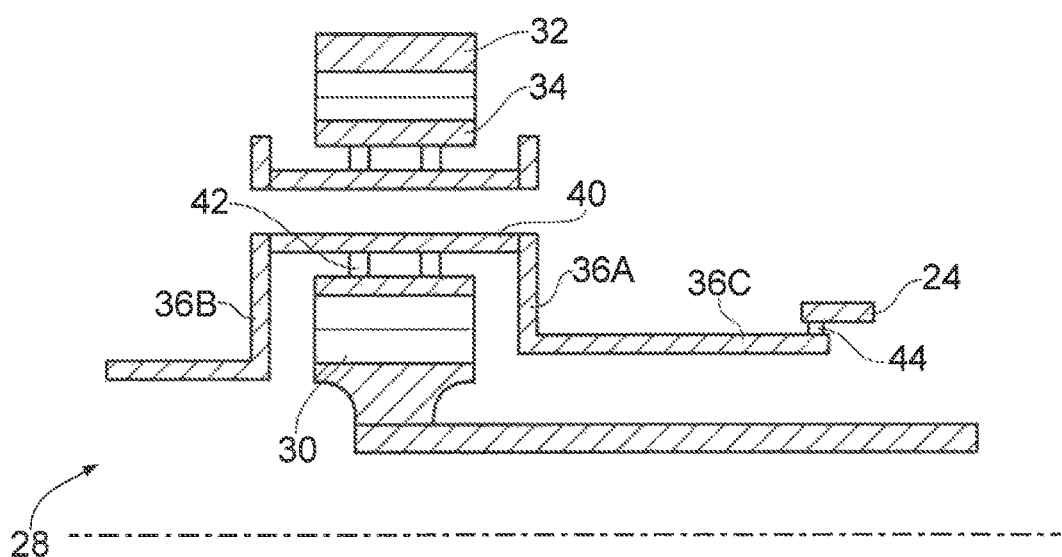
FIG. 3 is an enlarged cross-sectional view though the gearbox shown in FIG. 2.

The gearbox is shown more clearly in FIG. 3 which depicts a cross-section through part of the gearbox of FIG. 2. The carrier 36 comprises a first ring 36A and a second ring 36B spaced axially from the first ring 36A and a plurality of circumferentially spaced axles, also known as pins, 40 which extend axially between the first ring and the second ring. Each planet gear 34 is rotatably mounted on a respective one of the axles 40 and an annular extension e.g. an extension shaft 36C extends axially from the first ring 36A. Each planet gear 34 is rotatably mounted in the carrier 36 by at least one bearing 42. The extension shaft 36C is rotatably mounted in the static structure 24 by a bearing, e.g. a rolling element bearing 44.

In this particular arrangement each planet gear 34 is rotatably mounted on the carrier 36 by two rolling element bearings e.g. two roller bearings or two ball bearings 42. Alternatively each planet gear 34 may be rotatably mounted on the carrier 36 by a single rolling element bearing e.g. a single roller bearing or a single ball bearing, or a journal bearing.

The gearbox 28 shown in FIG. 3 is a planetary gearbox. The sun gear 30, the planet gears 34 and the annulus gear 32 each comprise single helical gear teeth. The annulus gear is secured to a surrounding structure.

Figure 4:
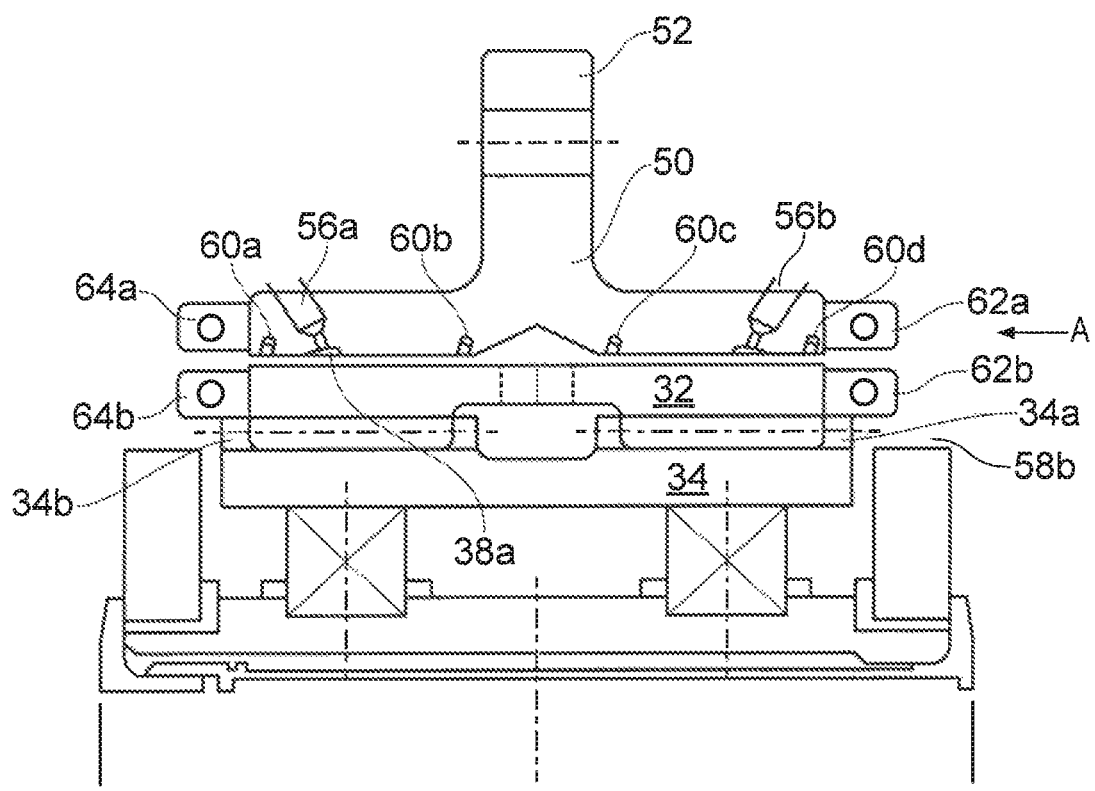
FIG. 4 is a further enlarged cross-sectional view of the annulus gear and surrounding structure of the gearbox shown in FIG. 3.

In the embodiment of FIG. 4 there is shown an arrangement using double helix planet gears 34 and a double helix annulus gear 32. The planet gear 34 has a first bank of helical gear teeth 34a axially separated from a second bank 34b of helical gear teeth. The annulus gear 32 has a first bank of helical gear teeth 32a axially separated from a second bank 32b of helical gear teeth. The first bank of gear teeth 34a on the planet gear mesh with the first bank of gear teeth on the annulus gear 32a and the second bank of gear teeth 34b on the planet gear mesh with the second bank of gear teeth 32b on the annulus gear. The angle of the gear teeth on the first and second banks may be different to mitigate any axial force caused by rotation of the planet gear 34 relative to the annulus gear 32.

The annulus gear 32 is defined as a static component in that it does not rotate. However, forces caused by rotation of the planet gears and/or mesh misalignment and mesh forces will cause the annulus gear to deflect slightly in a radial direction.

Radially outside the annulus gear 32 is a support structure 50 that is mounted to a further static part of the engine through a bolted flange 52. Other forms of attachment to the static part of the engine are possible but a single flange that is aligned with the axial centre of the annulus gear is desirable to keep the weight of the support structure low. Multiple flanges may be used and these are preferably arranged symmetrically with respect to the axial dimension of the annulus gear.

The annulus gear 32 is spaced from the support structure 50 by a narrow ring cavity 54 that is configured to receive a hydraulic fluid from fluid feed conduits 56a, 56b formed in the support structure. The hydraulic fluid is preferably a lubricant used for the gearbox to avoid carrying multiple different lubricants. It is therefore preferably an hydrocarbon based lubricant e.g. an oil.

Each outlet of the oil feed conduits 56a, 56b is in the radially inner surface of the support structure 50 that is provided with scallops 58a, 58b which help to ensure consistent oil supply to the ring cavity 54. Although they need not be used, sealing elements 60a-60b may be provided as a barrier to inhibit oil leaking from the ring cavity 54 in use. The sealing elements may be any appropriate seal element that is resistant to chemical attack from the lubricant and which can resist degradation caused by the temperature in which it operates and which can satisfy the lifetime requirements for the part. Suitable sealing elements may be O-rings or piston rings formed of metal and/or rubber.

At least two sealing elements may be provided 60a, 60d at the axial ends of the ring cavity. These can prevent oil from leaking from the axial ends of the ring cavity 54. However, where four sealing elements are provided 60a to 60d, the ring cavity 54 can be divided into two sections, each aligned with one of the annulus gear banks 32a, 32b.

It will be appreciated that to avoid stagnation there will be leakage of oil past the sealing elements. The sealing elements restrict flow from the cavity to ensure the cavity contains oil at an appropriate pressure and at an appropriate thickness. A collection cavity 62 that is located between the axially inner sealing elements 60b, 60c is connected to an outlet that returns oil that has passed the axially inner sealing elements to an oil sump. Lubricant that passes the axially outer sealing elements 60a, 60d is returned to the sump through the gearbox cavity.

The support structure 50 should be rigid enough to resist bending and the symmetrical mounting of the support structure 50 minimises the risk of there being a variation in the radial height of the ring cavity 54 along the axial extent of the annulus gear. A consistent film of oil is thereby maintained in the ring cavity 54.

The fluid in the ring cavity 54 provides vibration damping for the annulus gear 32. Any mode of vibration in the annulus gear 32 produces a variation in the radial gap between the radially outer surface of the annulus gear and the radially inner surface of the surrounding support structure 50 and hence imparts work on the fluid present in the ring chamber 54. The vibration damping of the annulus gear 32 reduces the amplitude of vibration of the annulus gear and hence reduces transmission errors, noise, and stresses and may enable the thickness and weight of the annulus gear to be reduced.

Further advantage may be achieved by resiliently mounting the annulus gear to the static structures of the engine. The resilient mounting may be configured to compliment the damping provided by the oil film such that vibrations that may not be fully damped by the oil film alone can now be damped. In the embodiment of FIG. 4 the resilient mounting is provided between the support structure 50 and the annulus gear 32.

Connection points 62a, 64a are provided on the axial extremity of the support structure. In the embodiment shown these are apertured flanges extending forward and aft from the forward and aft ends of the support structure. These may be formed integrally with the support structure or be permanently attached e.g. by welding, or they may be releaseably attached, for example by attaching to the support structure via a screw thread or other appropriate mechanical fastener.

Connection points 62b, 64b are provided on the axial extremity of the annulus gear. In the embodiment shown these are apertured flanges extending forward and aft from the forward and aft ends of the annulus gear 32. These may be formed integrally with the annulus gear or be permanently attached e.g. by welding, or they may be releaseably attached, for example by attaching to the annulus gear via a screw thread or other appropriate mechanical fastener.

Figure 5:
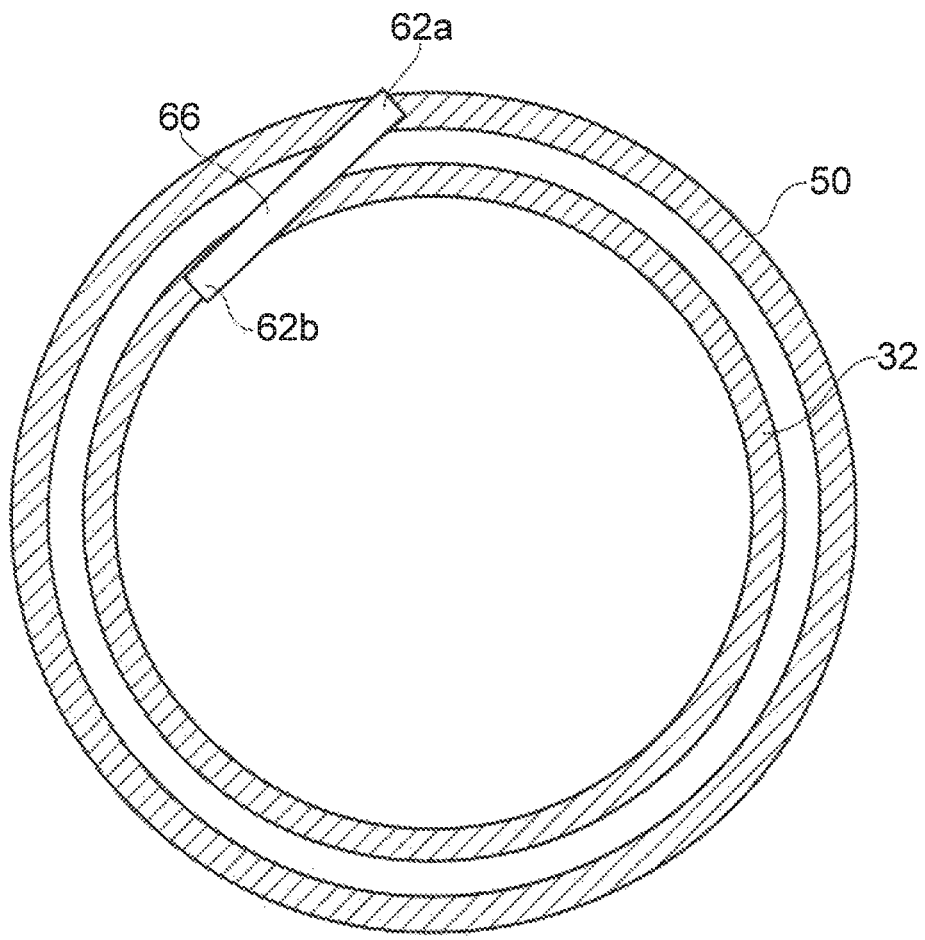
FIG. 5 is a simplified view on A of the gearbox of FIG. 4

FIG. 5 is simplified view on the arrangement of FIG. 4 along Arrow A. The connection points 62a and 62b are circumferentially offset with regard to each other. Although not shown, connection points 64a and 64b are similarly offset with regard to each other. The respective connection points are linked by a resilient member that extends tangentially from the support structure 50 to the annulus ring 32.

The resilient member 66 may be a metallic tie rod or plate the length, thickness and material being selected to control the desired movement between the annulus ring and the support structure 50. Although only a single resilient member is shown it will be appreciated that more than one may be provided around the circumference. It is preferable, but not necessary, for the length and hence the angle of each resilient member to be the same as the other resilient members. Different length resilient members can cause a circumferential variation in the operation of the fluid damper. Two, three, or four equally spaced resilient members 66 are preferred to minimise weight but for some arrangements more than four may be desired.

The connection points 62a, 64a may be circumferentially aligned or circumferentially offset. The connection points 62b, 64b may be circumferentially aligned or circumferentially offset. It is preferable for the points to be circumferentially aligned to minimise circumferential variation. It is also preferably, but not essential, for there to be the same number of connection points and resilient members on both the forward and aft ends of the support structure and annulus gear.

The angled resilient members also help to react the circular load on the annulus gear that is created by the torque of the gearbox. The load is transferred into the static structure.

Other forms of resilient member may be used to connect the support structure and the annulus gear. For example, the connection points 62a, 62b and 64a and 64b may be circumferentially aligned and this permits a spring to be inserted into the gap between the connection points. The practicalities of this arrangement will depend on the frequencies to be damped and the available radial gap for the spring. In some embodiments it may be possible to replace the spring with a foam or rubber pad.

Figure 6:
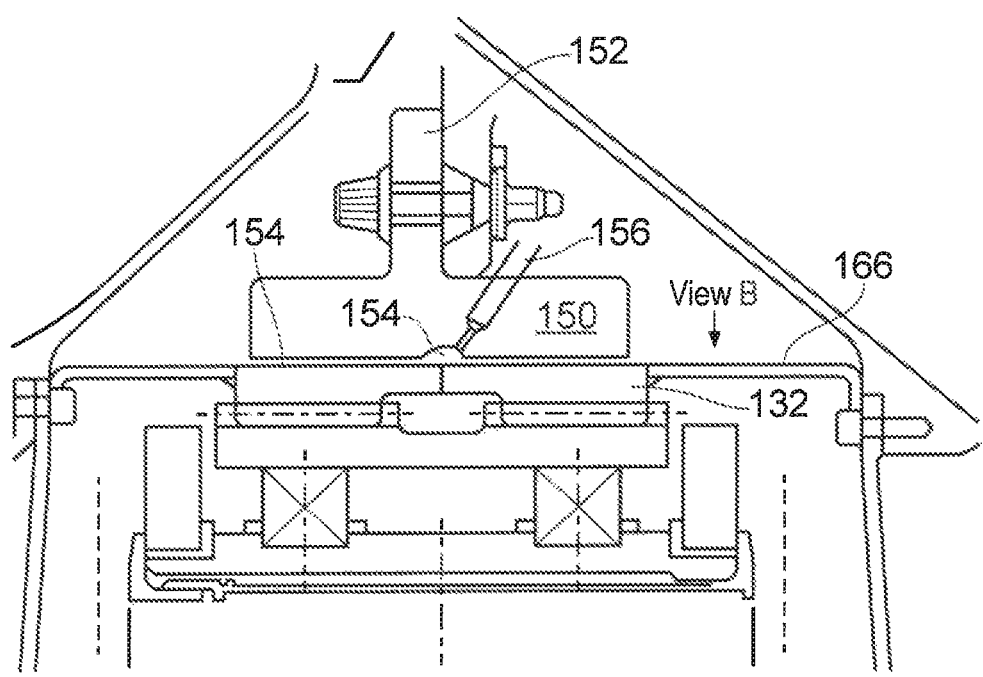
FIG. 6 is a cross-sectional view though a further gearbox according to the present disclosure.

In a further arrangement shown in FIG. 6 the annulus gear is connected to the static structure of the gas turbine engine using axially forward and axially rearward extending supports.

Radially outside the annulus gear 132 is a support structure 150 that is mounted to a further static part of the engine through a bolted flange 152. The annulus gear 132 is spaced from the support structure 150 by a narrow ring cavity 154 that is configured to receive a hydraulic fluid from fluid feed conduit 156 formed in the support structure. The hydraulic fluid is preferably a lubricant used for the gearbox to avoid carrying multiple different lubricants. It is therefore preferably an hydrocarbon based lubricant e.g. an oil.

The outlet of the fuel feed conduit 156 is in the radially inner surface of the support structure 150 which is provided with a scallops 158 that helps to ensure consistent oil supply to the ring cavity 154.

The support structure 150 should be rigid enough to resist bending and the symmetrical mounting of the support structure 150 minimises the risk of there being a variation in the radial height of the ring cavity 154 along the axial extent of the annulus gear as could be caused by an asymmetrical mounting. A consistent film of oil is maintained in the ring cavity 154.

Figure 7:
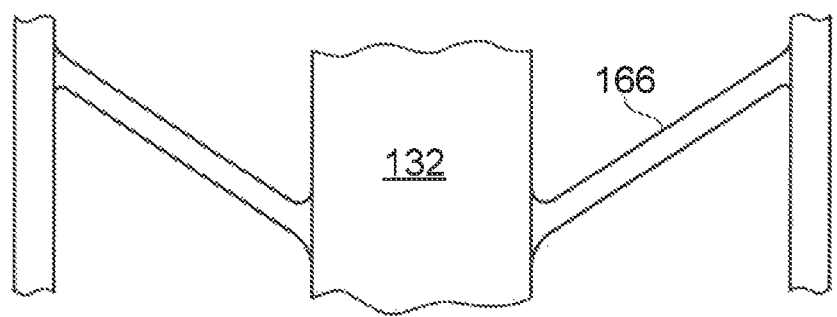
FIG. 7 is a simplified view on B of the gearbox of FIG. 6

The resilient member 166 is thin to permit flexure in the radial direction but is circumferentially stiff. As seen from FIG. 7 the resilient member is plate shaped and does not extend purely axially but also has a circumferential component. The angle of the member 166 is selected such that the length of the resilient member achieves an appropriate damping of the annulus gear vibrations. Additionally, the angle provides a stiffness in the circumferential direction that reacts some of the circumferential load generated by the torque of the gearbox.

By connecting the annulus gear to the static structure at both its forward and rearward edges the risk of an axial variation in the ring gap 154 is minimised. Accordingly high damping of the annulus gear is achieved.

In a further alternative construction that is depicted in FIG. 8, the annulus gear has a central resilient attachment feature that resiliently connects the annulus gear with the static structure of the gas turbine. The feature has one or more curves that permit radial flex and hence radial movement of the annulus gear. As the attachment feature is centrally mounted movement of the annulus gear is symmetrically radial across its entire axial length.

In order to provide this load path the thin film damper supporting structure is split in two with an axially forward damper and an axially rearward damper bisected by the resilient attachment feature.

Each of the thin film damper support structures 250 is mounted to a further static part of the engine through a bolted flange 252. Other forms of attachment to the static part of the engine are possible but a single flange that is aligned with the axial centre of each thin film damper support structure is desirable to keep the weight low. Multiple flanges may be used but these are preferably arranged symmetrically with respect to the axial dimension of each thin film damper support structure.

The annulus gear 232 is spaced from each thin film damper support structure 250 by a narrow ring cavity 254 that is configured to receive a hydraulic fluid from fluid feed conduits 256 formed in the thin film damper support structures. The hydraulic fluid is preferably a lubricant used for the gearbox to avoid carrying multiple different lubricants. It is therefore preferably an hydrocarbon based lubricant e.g. an oil.

Each outlet of the fuel feed conduits 256 is in the radially inner surface of each thin film damper support structure 250 which is provided with scallops that help to ensure consistent oil supply to each ring cavity. Although they need not be used the sealing elements may be provided as a barrier for the oil leaking from the ring cavity 254 in use. Further information regarding the sealing elements may be found by reference to FIG. 4

In each of the arrangements described above the sun gear, the annulus gear, the carrier and the shaft are coaxial. The gear arrangements may have helical gear, double helical gear or axial gear configurations as appropriate.

In each of the arrangements described above lubricant, e.g. oil, lubricates and cools the sun, annulus and planet gears and the bearings of the planet gears.

As described above, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

Alternatively, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

Alternatively, the gas turbine engine comprises a propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the propulsor via a gearbox.

Alternatively the gas turbine engine may comprise a propulsor, a high-pressure compressor, a high-pressure turbine and a low-pressure turbine, the high-pressure turbine is arranged to directly drive the high-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine, an intermediate-pressure turbine and a low-pressure turbine, the high-pressure turbine is arranged to directly drive the high-pressure compressor, the intermediate-pressure turbine is arranged to directly drive the intermediate-pressure compressor and the low-pressure turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine, a low-pressure turbine and a free power turbine, the high-pressure turbine is arranged to directly drive the high-pressure compressor, the low-pressure turbine is arranged to directly drive the low-pressure compressor and the free power turbine is arranged to drive the first propulsor and the second propulsor via a gearbox.

Alternatively, the gas turbine engine comprises a first propulsor, a second propulsor, a low-pressure compressor, a high-pressure compressor, a high-pressure turbine and a low-pressure turbine, the high-pressure turbine is arranged to directly drive the high-pressure compressor, the low-pressure turbine is arranged to directly drive the low-pressure compressor and the low-pressure turbine is arranged to drive the first propulsor and the second propulsor via a gearbox.

The sun gear may be driven by a low-pressure turbine, and the carrier may be arranged to drive a propulsor.

The propulsor may be a fan or a propeller.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising a gearbox, the gearbox comprising a sun gear, an annulus gear, a plurality of planet gears and a carrier, each planet gear being rotatably mounted in the carrier by at least one bearing, the sun gear meshing with the planet gears and the planet gears meshing with the annulus gear, the sun gear, the planet gears and the annulus gear comprising gear teeth, the annulus gear having a length in the axial direction and an axially forward end and an axially rearward end and wherein the annulus gear is resiliently mounted to a static supporting structure at both its axially forward and axially rearward ends, wherein the static supporting structure is radially outside the annulus gear and separated from the annulus gear by a cavity configured to receive a damping volume of hydraulic fluid.

2. The gas turbine engine according to claim 1, wherein the static supporting structure has one or more conduits adapted to supply hydraulic fluid to the cavity.

3. The gas turbine engine according to claim 1, wherein the cavity comprises hydraulic seals at an axially forward end and an axially rearward end.

4. The gas turbine engine according to claim 3, wherein the static supporting structure has two conduits adapted to supply hydraulic fluid to the cavity, wherein a first one of the two conduits is located in a first half of the axial length of the supporting structure and a second one of the two conduits is located in a second half of the axial length of the static supporting structure.

5. The gas turbine engine according to claim 4, further comprising two further hydraulic seals positioned between the first one of the two conduits and the second one of the two conduits.

6. The gas turbine engine according to claim 1, wherein the annulus gear has one or more attachment locations configured to secure a first end of a damping linkage and the static support structure has one or more attachment locations configured to secure a second end of the damping linkage.

7. The gas turbine engine according to claim 6, further comprising a damping linkage connecting a first attachment location on the annulus gear and a second attachment location on the static support structure.

8. The gas turbine engine according to claim 7, wherein the first attachment location and the second attachment location are circumferentially offset.

9. The gas turbine according to claim 8, wherein the carrier has an intended direction of circumferential rotation, wherein the first attachment location is circumferentially forward than the second attachment location.

10. The gas turbine engine according to claim 7 further comprising multiple damping linkages each connecting a respective first attachment location with a respective second attachment location.

11. The gas turbine engine according to claim 10 wherein at least one of the first attachment locations is on an axially forward end of the annulus gear and at least one of the second attachment locations is on an axially forward end of the static support structure.

12. The gas turbine engine according to claim 11 wherein at least one of the first attachment locations is on an axially rearward end of the annulus gear and at least one of the second attachment locations is on an axially rearward end of the static support structure.

13. The gas turbine engine according to claim 1, wherein the annulus gear has a first damping linkage extending axially and laterally from the forward end to the support structure and a second damping linkage extending axially and laterally from the rearward end to the static support structure.

14. The gas turbine engine according to claim 13, wherein each damping linkage has a length between the annulus gear and the static support structure, a width in the lateral direction and a depth, wherein the depth is less than both the width and the length for permitting movement of the annulus gear in the depth direction and constraining the movement of the annulus gear in the length and lateral direction.

15. The gas turbine engine according to claim 14, wherein the cavity comprises hydraulic seals at an axially forward end and an axially rearward end.

16. The gas turbine engine according to claim 15, wherein the thin film damper supporting structure has two conduits adapted to supply hydraulic fluid to the cavity, wherein a first one of the two conduits is located in a first half of the axial length of the thin film damper supporting structure and a second one of the two conduits is located in a second half of the axial length of the supporting structure.

17. The gas turbine engine according to claim 16, further comprising two further hydraulic seals positioned between the first one of the two conduits and the second one of the two conduits.

18. A gas turbine engine comprising a gearbox, the gearbox comprising a sun gear, an annulus gear, a plurality of planet gears and a carrier, each planet gear being rotatably mounted in the carrier by at least one bearing, the sun gear meshing with the planet gears and the planet gears meshing with the annulus gear, the sun gear, the planet gears and the annulus gear comprising helical gear teeth, the annulus gear having a length in the axial direction and an axially forward end and an axially rearward end and wherein the annulus gear is resiliently mounted to a supporting structure at its axial midpoint and wherein two thin film damper support structures are positioned radially outside the annulus gear and separated from the annulus gear by respective cavities configured to receive a damping volume of hydraulic fluid.

19. The gas turbine engine as claimed in claim 1 comprising a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the propulsor and the low-pressure turbine is arranged to drive the intermediate-pressure compressor via a gearbox.

20. The gas turbine engine as claimed in claim 19 wherein the propulsor is a fan or a propeller.

* * * * *